Figure 1:
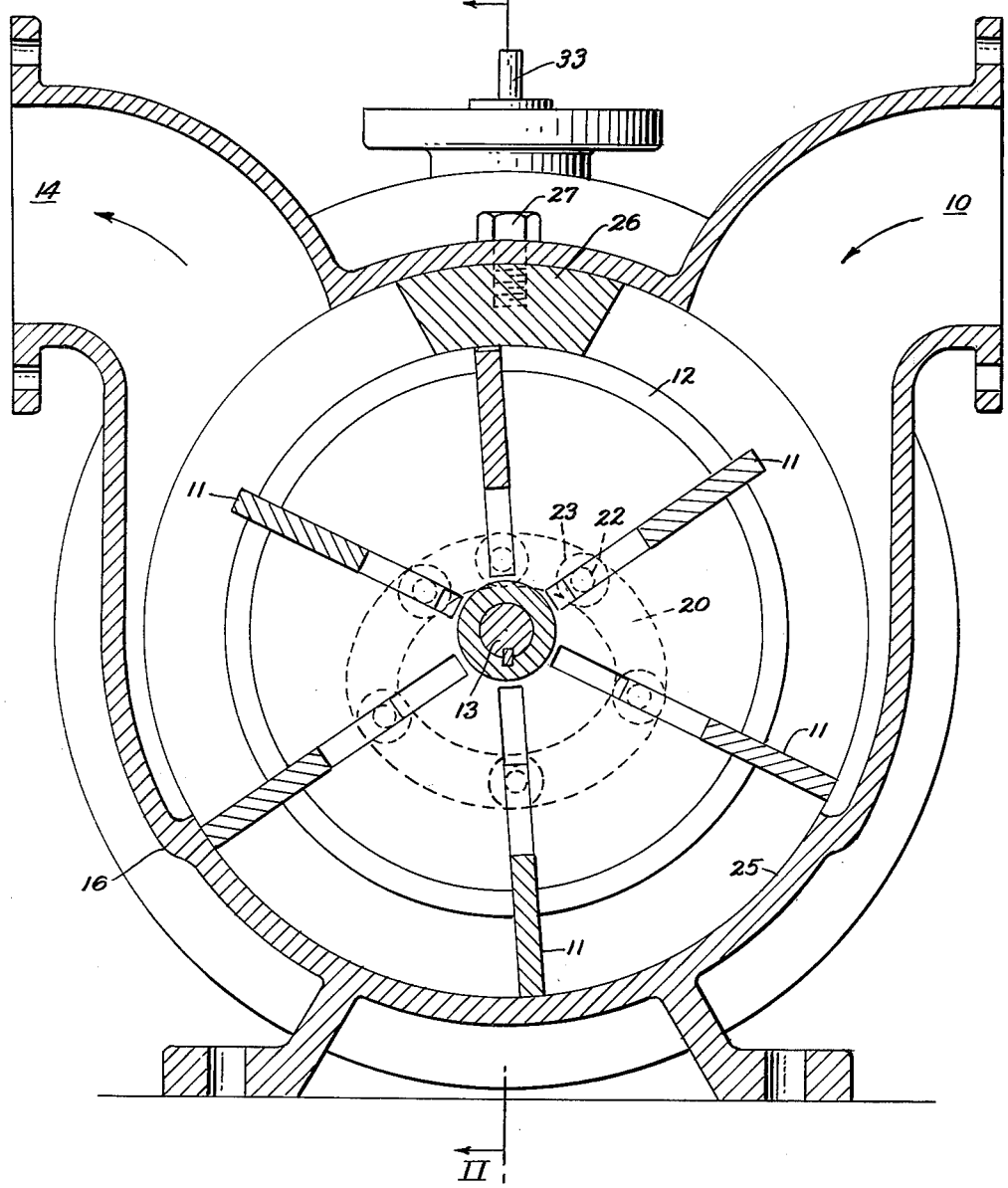

INVENTOR.
ALBERT J. GRANBERG
BY
Fryer + Tjensvold
ATTORNEYS

United States Patent Office 3,212,331
Patented Oct. 19, 1965

3,212,331
FLUID METER
Albert J. Granberg, Oakland, Calif., assignor to Cal-Meter Co., Emeryville, Calif., a corporation of California
Filed Sept. 17, 1962, Ser. No. 224,111
1 Claim. (Cl. 73—259)

This invention relates to fluid meters and particularly to improvements in rotary vane-type meters uesd for metering the flow of gasoline or other liquid fuels or oil.

It is an object of the invention to provide a fluid meter of economical but accurate design.

A further object of the invention is to provide a rotary vane-type meter in which at least two vanes are always in sealing position with respect to the housing to minimize leakage which results in inaccurate metering.

It is also an object of this invention to provide a rotary vane-type meter in which all of the vanes are positively reciprocated during their rotary motion by two cams and two sets of cam rollers on each vane to insure positive and accurate reciprocation of the vanes.

Still further and more specific objects and advantages of the invention are made apparent in the following description wherein reference is made to the accompanying drawings illustrating a preferred form of the invention.

Figure 2:
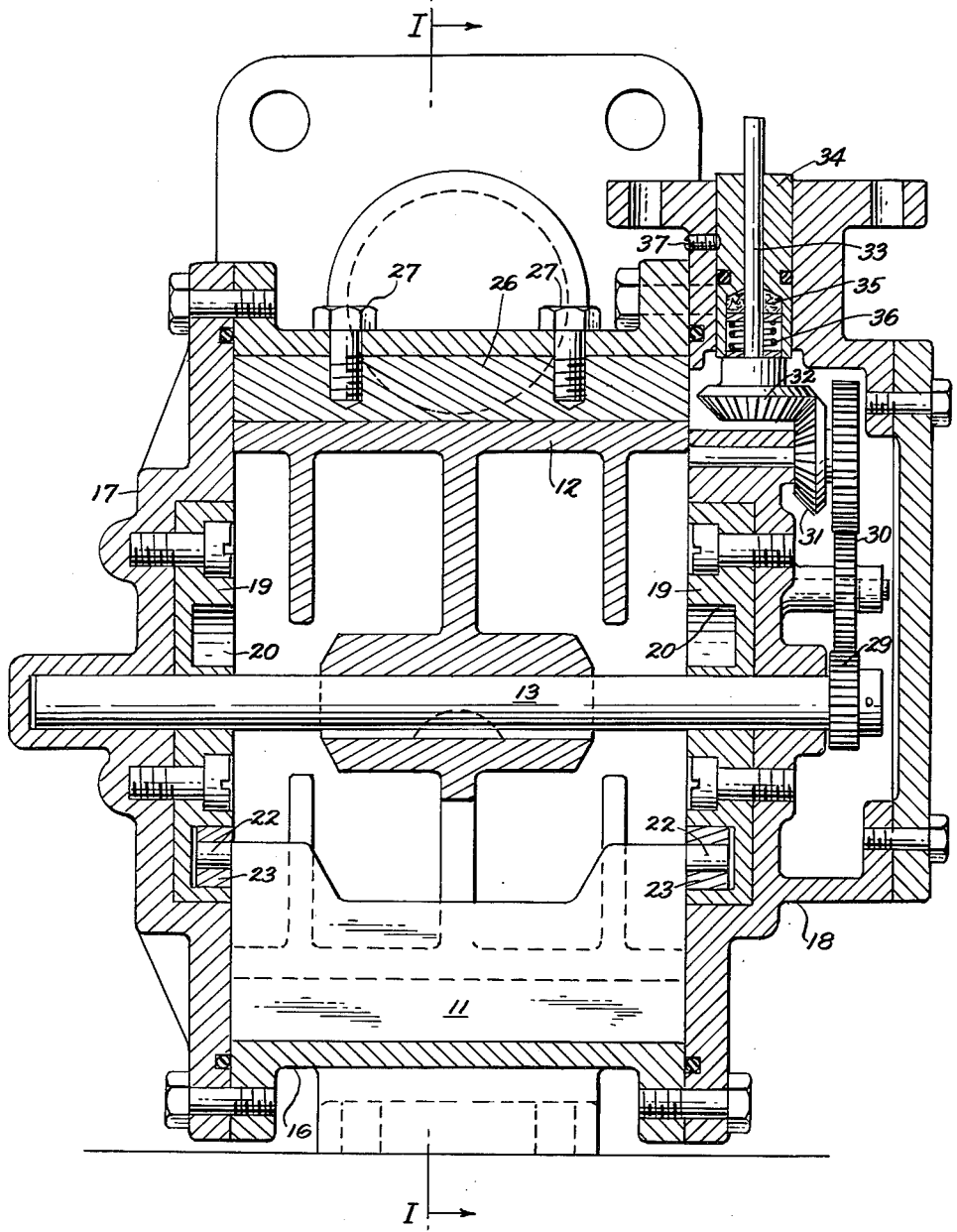

In the drawings:

FIG. 1 is a vertical sectional view of a meter embodying the present invention, the section being taken on the line I—I of FIG. 2; and FIG. 2 is a transverse sectional view taken on the line II—II of FIG. 1.

Referring first to FIG. 1 of the drawings, the meter therein disclosed is of the type in which liquid entering through an inlet 10 impinges vanes 11, a plurality of which are reciprocably mounted in a rotor 12 which is keyed to a shaft 13 so that the force of the liquid impinging on the vanes imparts rotation to the shaft which rotation is measured or counted in a manner presently to be described to indicate the amount of liquid which has passed through the meter and flowed outwardly through a discharge opening 14.

Referring now to FIG. 2, the vanes 11 and rotor 12 are shown as contained within a substantially cylindrical housing 16 having an end cover 17 secured to one end and a combined end cover and gear box 18 secured to the opposite end. The end covers provide bearings for the opposite ends of the shaft 13 and are also recessed for the reception of a pair of matching box cams 19 having grooves 20 therein. Each of the blades 11 is provided with a pair of blade arms 22 projecting from its opposite end and provided with anti-friction rollers 23 fitting within the groove 20 of the box cam 19.

Referring again to FIG. 1, the shape and disposition of the cam groove 20 is shown to be such that it effects reciprocation in a radial direction with respect to the rotor 12 of the blades 11 which are guided in suitable slots in the rotor. The cam is also arranged to project the blades 11 into wiping contact or extremely close proximity to a land 25 of arcuate shape extending throughout a large portion of the bottom of the housing 16. As the vanes, which rotate in a clocklike direction as viewed in FIG. 1, leave the land 25, they are retracted due to the configuration of the cam slot 20 to a position where they will pass a spacer block or short land 26 secured as by cap screws 27 to the inner upper wall of the housing. The land 26 serves the purpose of directing incoming liquid from inlet 12 downwardly to rotate the rotor and vanes and then upwardly and outwardly through the outlet 14. This land is shaped to form a seal with the rotor 12 so that the vanes may be retracted to positions which clear the land. Thus there is no possibility of interference of the vanes with the land. Furthermore the distance of retraction is not critical so the necessity for precision in the upper portion of the box cams 20 is greatly reduced.

The number of complete rotations of the motor and its shaft 13 indicates the amount of liquid which is passed through the meter and these rotations are transmitted to a counter by means of the gearing shown in FIG. 2. The shaft 13 is shown as fitted with a spur gear 29 meshing with an idler 30 which drives a cluster gear including a bevel gear 31 meshing with a similar bevel gear 32 on a shaft 33. This shaft is sealed by a packing gland 34 and packing 35 upon which uniform and constant compression is maintained by a spring 36. The packing gland is fixed in its bore as by a set screw 37. The shaft 33 is connected to and drives suitable counting mechanism, not herein disclosed, which provides a reading in gallons or other suitable units of the volume of fluid which has passed through the meter.

One of the principal advantages of the present invention results in the fact that the land 25 shown in FIG. 1 extends for a distance substantially equal to the spacing of the outer end of three of the vanes 11 with the result that at least two such vanes are always in contact with the land maintaining a locked volume of liquid in the space between two vanes, the rotor and the land to insure accurate measurement of flow through the meter. The fact that two vanes are always in contact with the land also minimize leakage past the vanes since any leading fluid must pass two vanes rather than one vane as in conventional vane-type meters. This has the further advantage that in minimizing leakage, minimum error occurs as a result of changes in viscosity of the fluid of the liquid being metered as leakage is greater with low viscosity liquids than that with high viscosity liquids. Where only two vanes are in contact with such a land in a meter, the liquid is confined between them for a very brief period while most of the time liquid is free to enter or leave the confining area. Turbulence and variations in velocity therefore interfere with the accuracy of metering. These disadvantages are overcome by the present structure which confines a measured body of liquid for a relatively long period of time. Furthermore since all of the vanes are positively driven with box-like cams arranged at their opposite ends, there is little tendency of distortion of the vanes and light weight construction of the moving parts may be employed.

I claim:

A rotary vane type meter having a rotor, at least six vanes mounted for reciprocation radially of the rotor, a housing enclosing said rotor and vanes, an inlet and an outlet in the housing, a passage connecting the inlet and outlet confining the flow of fluid therebetween to space between the rotor and housing, a land in said passage disposed for cooperation with not less than two of said vanes at all times, the configuration of said vanes being such as to confine fluid to the spaces between the vanes the rotor and the land, each of said vanes having a pair of arms extending outwardly from its opposite edges and carrying antifriction rollers, and box cams disposed at opposite sides of the housing and receiving said rollers, the configuration of the box cams being such as to effect positive reciprocation of the vanes radially of the housing and insure that their outer ends pass said land in close proximity thereto.

References Cited by the Examiner

UNITED STATES PATENTS

| | | | |
|---|---|---|---|
| 643,432 | 2/00 | Washington et al. | 73—259 X |
| 854,849 | 5/07 | Seitz. | |
| 1,611,346 | 12/26 | Haley | 73—259 |
| 2,296,542 | 9/42 | Steen | 73—259 X |
| 3,053,088 | 9/62 | Granberg | 73—259 |

RICHARD C. QUISSER, *Primary Examiner.*